United States Patent [19]

Cheng et al.

[11] Patent Number: 5,627,357
[45] Date of Patent: May 6, 1997

[54] MAGNET INFORMATION CARDS

[76] Inventors: Lee M. Cheng, Flat 0A, Ground Floor, Block 7, Tak Chee Yuen, 88 Tat Chee Avenue, Kowloon, Hong Kong; Lee L. Cheng, Flat 05, 19th Floor, Block 33, Heng Fa Chuen, Chai Wan, Hong Kong; Man C. Chu, 15th Floor, Flat 12, 124-134 Belcher's St., Kennedy Town, Hong Kong

[21] Appl. No.: 456,038

[22] Filed: May 31, 1995

[30] Foreign Application Priority Data

Jun. 28, 1994 [GB] United Kingdom ............... 9412968

[51] Int. Cl.$^6$ .................. G06K 7/08; G06K 19/06
[52] U.S. Cl. ............................ 235/449; 235/493
[58] Field of Search ................ 235/493, 380, 235/449, 450; 902/3, 4, 5, 25, 28; 340/825.34; 360/2

[56] References Cited

U.S. PATENT DOCUMENTS

| | | | |
|---|---|---|---|
| 4,469,937 | 9/1984 | Stockberger et al. | 340/825.34 |
| 4,566,121 | 1/1986 | Samyn | 382/7 |
| 4,584,529 | 4/1986 | Aoyama | 324/261 |
| 4,650,978 | 3/1987 | Hudson et al. | 235/380 |
| 4,806,740 | 2/1989 | Gold et al. | 235/449 |
| 4,916,294 | 4/1990 | Goldman | 235/449 |
| 4,916,295 | 4/1990 | Chominski | 235/449 |
| 4,929,821 | 5/1990 | Kocznar et al. | 235/493 |
| 5,196,681 | 3/1993 | Mantegazza | 235/449 |
| 5,254,843 | 10/1993 | Hynes et al. | 340/825.34 |
| 5,367,572 | 11/1994 | Weiss | 340/825.34 |
| 5,451,759 | 9/1995 | Hoshino et al. | 235/449 |
| 5,473,147 | 12/1995 | Hoshino et al. | 235/449 |

FOREIGN PATENT DOCUMENTS

| | | | |
|---|---|---|---|
| 490083A1 | 6/1990 | European Pat. Off. | 235/449 |
| 5344562 | 12/1993 | Japan | 340/825.34 |
| 2214679 | 9/1989 | United Kingdom | 235/449 |
| 2240947 | 8/1991 | United Kingdom | 340/825.34 |

*Primary Examiner*—Donald T. Hajec
*Assistant Examiner*—Le Thien Minh
*Attorney, Agent, or Firm*—Gunn, Lee & Miller, P.C.

[57] ABSTRACT

Magnetic cards are provided with unique card signatures which include a number of bits, some of which have intermediate magnetic levels. As a result a card reader allocates randomly either a one or a zero to the intermediate level bits. The random allocation provides a test for the genuineness of the card. The intermediate level bits are formed as a result of inherent inconsistencies in the characteristic of a normal magnetic stripe along its length. It is not possible therefore to readily, if at all, reproduce patterns of intermediate level bits in a duplicate because the stripe on the duplicate will have differently arranged inconsistencies along its length.

10 Claims, 3 Drawing Sheets

MAGNET INFORMATION CARDS

BACKGROUND OF THE INVENTION

1. Field of Invention

The invention relates to magnetic cards.

2. Description of Prior Art

The invention relates more particularly to magnetic cards in the form of credit cards, automatic teller machine cards, membership cards guest cards, pre-paid cards for telephones and the like. Such cards are generally formed of plastic and carry a one or more magnetic tracks which carry binary codes. The codes are normally for identifying the issuer or system and the user as well as a pin number or user signature. It is normal also to provide information about the expiry date, the credit limit or credit currently available for the user and so on. The card often carries a cipher which is a compilation of the system code and the pin number. Generally, the cards are used automatically and card readers provided a points-of-need which are capable of reading the binary codes and controlling an entry terminal to dispense cash or simply identify that the card is genuine and in force, at a point-of-sale for example.

Generally stated, problems arise because such cards are relatively simple to copy or to re-produce and so represent a risk for both issuers and users. Methods of "protection" have therefore been developed already to reduce these problems but most current methods concentrate on making the card itself more difficult to duplicate. Such protection methods include adding a hologram, using especially fine printing, ultraviolet ink, photographs and incorporating active integrated circuit chips (sometimes called "smart" cards). The main disadvantages of these solutions is that they inherently add to the cost of producing genuine cards and in some cases also require generally more sophisticated card readers in use for satisfactory checking of the cards.

SUMMARY OF THE INVENTION

It is an object of the present invention to provide 'protected' cards and methods for producing such cards which remove or at least reduce the above disadvantages.

According to one aspect of the invention, there is provided a magnetic card having normal coded information carried on the card, each bit of the code information being formed by a magnetic value representing either a one or a zero for detection by a card reader arranged to normally allocate either a one or a zero to each bit, including a card signature formed by bits positioned at fixed relative positions on the card having intermediate magnetic values in which in use the reader randomly allocates a one or a zero.

The signature bits may be positioned at fixed relative positions relative to one or more bits of the normal coded information bits and/or to a signature marker bit carried on the card.

The signature bits are preferably carried on the card in a first magnetic track extending along the card.

The magnetic card may have normal coded information separately representative of a system signature and a user signature, and include a cipher of normal coded information formed by a compilation of the system and user signatures and the card signature.

The magnetic card may have three magnetic tracks in which the card signature is formed in a first track, the cipher is formed in a second track, and the user signature is formed in a third track.

The card signature is preferably formed in a normally unused part of a magnetic track on the card.

According to another aspect of the invention there is provided a method of forming a magnetic card in which a card signature is formed by writing either ones or zeros onto a part of a magnetic track of a blank card, covering the part of the track with thin masks, and writing either zeros or ones respectively onto the part of tracks to form a number of bits having intermediate magnetic values to form the card signature.

The method may include covering the card signature with a protective thick mask, writing normal coded information on to the card, and then removing the protective mask.

BRIEF DESCRIPTION OF THE DRAWINGS

A magnetic credit card, a method of producing the card and a card reader will now be described by way of example with reference to the accompanying drawings in which.

DESCRIPTION OF PREFERRED EMBODIMENTS

Figure 1:
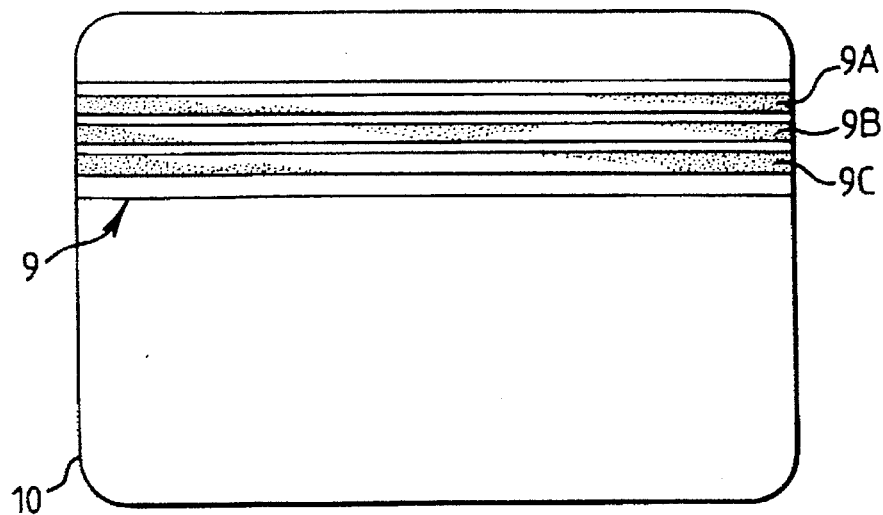
FIG. 1 shows a card with a magnetic stripe having three tracks.

Referring to the drawings, in FIG. 1 a stripe 9, which is a strip of magnetic material carrying machine readable bits forming binary codes, is provided on a plastic card 10. The data or bits, typically carried on each of three tracks 9A, 9B and 9C, represents the name of the card holder in track 9A, an account number in track 9B and the issuer code in track 9C. The normal coded information also includes cash amounts authorised by the card. In all cases and according to International Standards ISO 7811 none of the tracks are fully used. ISO 7811 defines that the maximum number of bits normally used for each of three tracks leaves parts of each track blank consisting of about a quarter length of each track, which formerly has been normally unused.

Thus parts of the normal coded information includes a "system signature" representing the card issuer and a "user signature" (PIN). In accordance with embodiments of the invention the magnetic cards also have a unique "card signature". The special card signature is provided to prevent duplication of the magnetic cards and depends on the unique magnetic characteristics of each genuine card supplied by the issuer. The card signature is conveniently located at the right hand end or region of track 9A.

In the production of the stripe 9, the physical and chemical consistency of the stripe is rendered as consistent as reasonably practical along its length. However, that consistency is not completely uniform and in producing cards of the present invention the inconsistencies are relied upon or used to generate cards having a unique code representing the card signature. In other words, each card itself when made up and coded has a card signature which is unique for a particular card because its signature depends on the random inconsistencies in the magnetic properties along the stripe on each particular card. Even if the same method of producing two cards is repeated, the two cards will in practice not have the same signature because the relative positions of the normal inconsistencies along the stripes will be different. Thus different signatures will always be formed. In providing magnetic cards according to the invention, the relative physical disposition of the bits of information forming the card signature on the card which exhibit so-called "intermediate magnetic values" are used or made use of the qualify the genuineness of each card.

In practice or use of a magnetic card, a normal card reader is programmed to read bits of information at various positions on magnetic cards. At each position the card reader must allocate either a zero or a one to the bit formed on the stripe instantaneously then opposite a reading head of the reader. International Standard (ISO) 7811 para 6.2.1 lays down the Industry requirements for magnetically recorded data. Thus a binary one is identified by producing a current of 500% of a reference current and binary zero is identified by producing a current of 350%. These values, with specified tolerances either side, will be allocated by a card reader as either ones or zeros accordingly. Should the current produced by a data bit be, say, around 425% of the reference current, which value would be included in this application as having a so-called "intermediate" value, the card reader in practice will randomly allocate either a one and or a zero. The fact that the normal reader inconsistently allocates different binary numbers to such a bit identifies that the card is a genuine card. The positions of the random bits or numbers, as it were, relative either to other normal information on the card, or to a normal bit provided as a card signature marker, is used to check the genuineness of the magnetic card.

Thus a simple test for magnetic cards of the present invention is to pass the card through a reader twice. If the card signature bits read out as the same code, the card can be presumed not to be genuine.

In a practical situation, it is not normally enough to read the card twice and simply to ascribe genuineness to a change anywhere in the card signature region of track 9A, the physical position of any changes in reading must also be monitored. Of course as these changes are random, it is statistically possible that a change will not take place at one specific intermediate value bit location. Therefore in order to determine the actual card signature in the beginning, the card is normally read say 50 times. This will locate all the intermediate value bits.

The total signature typically consists of 30 to 50 bits and has around 25 to 30 intermediate value bits respectively. Further as already explained, the establishment of the special or intermediate value bits depends on variations in the physical/chemical inconsistencies of the stripe material, and so the special bits will tend to occur in practice in sequences or batches along the card signature region. It is therefore necessary in practice to identify physically with respect to the signature marker bit, say, where the batches are. Whenever the signature is read, one at least of each batch is likely to change each time according to any read out and so in practice, it is sufficient to determine that one change at least has taken place in each sequence or batch location. Thus, it is quite clear that if the card signature does not change at all even when read only twice that the card is not genuine. (This could serve as a first or point-of-use test.) On the other hand to test a card for genuineness, that is to test more positively, if a card is read say four or five times and all read out changes lie within the batch locations, the card could reasonably be regarded as genuine.

The card normally has a cipher at a right hand end part of track 9B. The cipher is formed as normal coded information and represents a compilation of the system signature (issuer's code), the PIN number and the card signature. The card signature information used for the compilation contains the relative physical positions or regions of the intermediate value bits on the card. Compilation means simply that the information identifying the system signature, the PIN number and the card signature are put together by a system program to produce the cipher code. When a card is checked, the information must match. Compilation techniques as such are already used for magnetic cards to provide ciphers.

Figure 3:
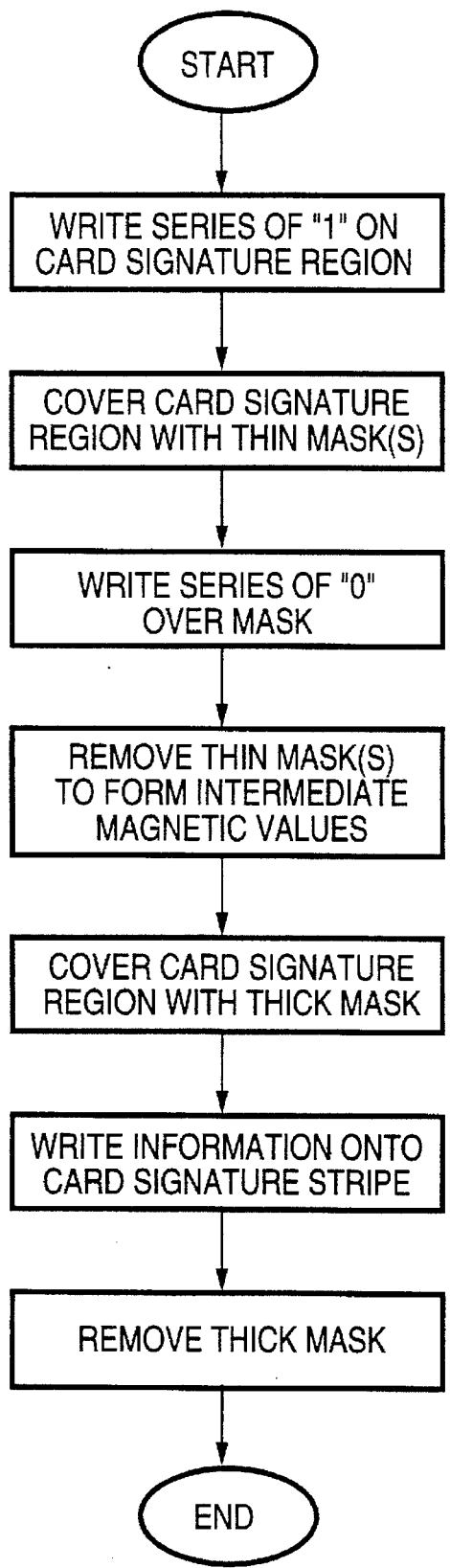
FIG. 3 is a flow diagram illustrating the steps of forming the card signature magnetic stripe.

In one method to form the special card signature on the stripe 9, a write logic "1" is written in to all available data bits of a card signature region. A thin (0.05 cm) plastic mask is or number of thin masks are placed over the region on the magnetic stripe. A series of logic "0" is then written on to the stripe. The thin mask or masks are then removed. See FIG. 3.

The card signature region is then covered with a thick (0.2 cm) plastic mask and the normal information written onto the stripe in the usual way. The protective mask is then removed.

Each signature comprises a unique pattern of bits for each particular card. Due to inherent non-uniform magnetic properties of the stripe 9 some bits are converted in the method more towards an '0' magnetic value than other bits by the write over of the series of logic "0" signals with the, thin masks in place. As a card reader must allocate either a logic "1" or a logic "0" to each bit, some bits are read with uncertainty, as they exhibit an intermediate magnetic value. The reader will therefore as a matter of practice allocate '0' sometimes and '1' at other times.

The unique card signature bits therefore owes their form and position to the non-uniform characteristics of the magnetic stripe 9. In order to check further that the card is genuine a fixed mark, formed by a normal bit, is positioned on the stripe 9 and distances or positions determined as to where the 'uncertain' bits are relative to the fixed mark. Thus the signature can be checked by the positions of these "uncertain" or intermediate unique bits.

As the formation of the intermediate magnetic level bits is inherently somewhat random, a card signature may be formed by the method with too many intermediate level bits per card signature for practical purposes. This can be overcome by using a number of thin masks instead of a thin single mask. It may also be overcome by writing over the thin mask with the series of logic '0' more than once, or deliberately (or otherwise) varying the precise thickness of the thin mask along its length.

It will also be noted in this context that the magnetic level exhibited by each bit is dependent on a magnetic hysteresis effect and so there is less tendency than normally would be the case for the magnetic level to be set at a, say, truly intermediate or central level (that is to produce 425% of the reference current). This is because the bits formed after the write over with the series of logic "0" will tend to remain either somewhat nearer the "1" level or be converted nearer towards the '0' level than would be the case without the practical hysteresis effect. This leads in practice to the likely formation of fewer intermediate level bits than would otherwise be naturally the case in the method described.

Further, the method is much more dependent, again as a matter of practice, to form the intermediate card signature bits in dependence upon the random inconsistencies in the magnetic properties of the stripe 9 along its length. Thus and importantly, as the card signature bits at least partially derive their uncertain characteristic by the imperfections of the stripe itself they cannot be repeated or reproduced in practice on a different length of stripe 9.

In practice therefore a genuine card is first provided with a unique signature and the positions of the uncertain bits (at the intermediate level) recorded and a code identifying those positions is generated. That code is combined (compiled) with the issuer's signature and the user's personal signature (PIN) in a chosen format using a suitable software program and a (cipher) security code representing is generated and written on to the end of the track 9B.

Figure 2:
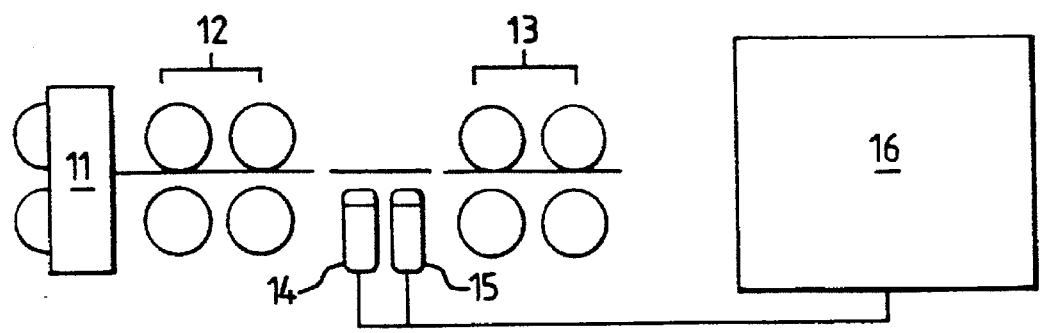
FIG. 2 shows a schematic arrangement of the card reader.
Figure 4:
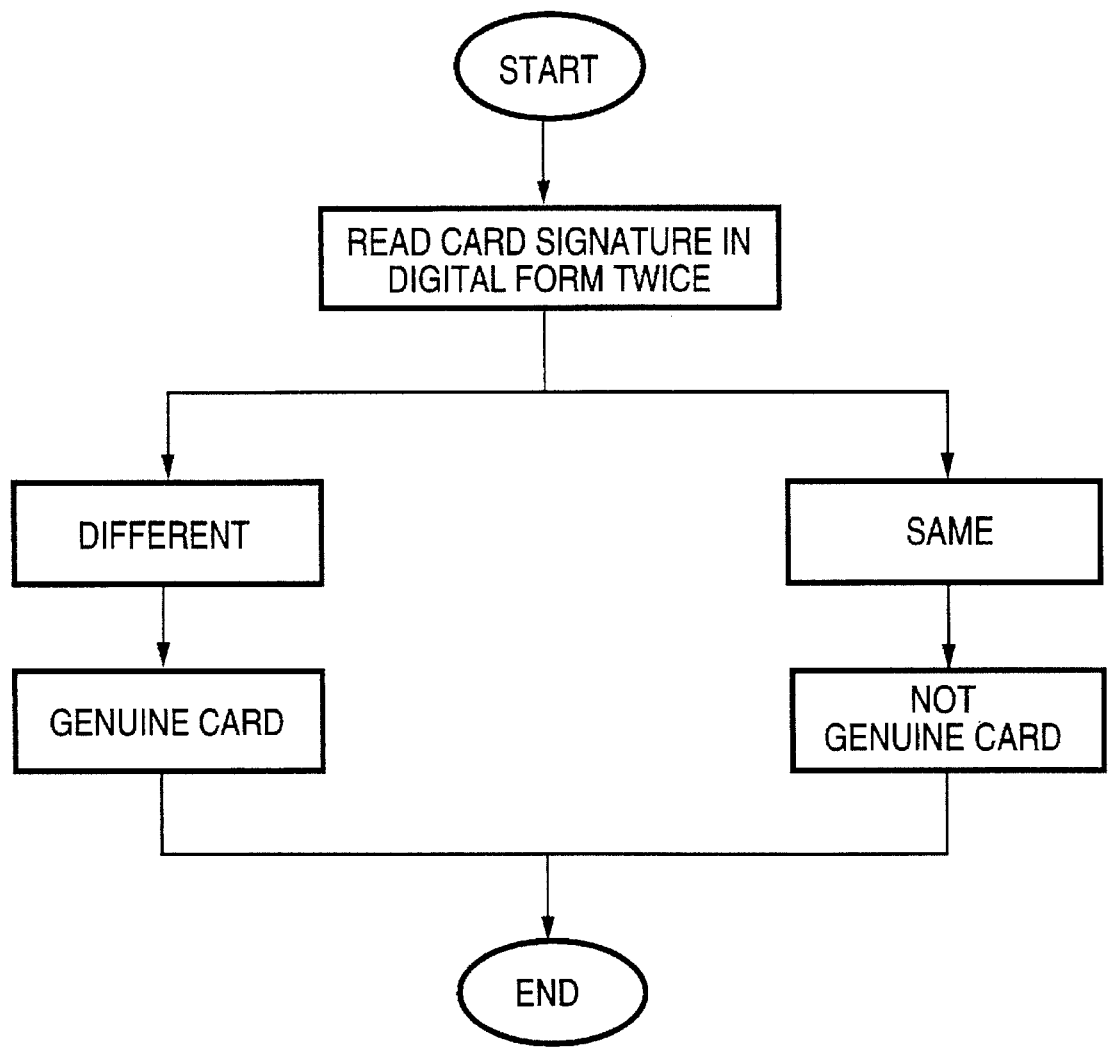
FIG. 4 is a flow diagram illustrating the steps of card signature verification.

A card reader is shown in FIG. 2, in which rollers are provided at an entry housing 11 and driving sets of rollers 12 and 13 are positioned to take the card past a pair of reading heads 14 and 15. The reading heads are electrically connected to a processor 16. With the reader in FIG. 2, data or bits on the card are read twice in succession as the card passes adjacent the heads 14 and 15. Thus, a card may be passed through the card reader in one direction and the data, especially the card signature can be read twice to determine immediately as described above immediately, or as a first appraisal at least, whether the card is genuine. That is to say, if the card signature appears to be the same when read by the two heads 14 and 15, it can be presumed that the card is not genuine. The card can of course be read twice again, as the card passes back towards and out of the housing 11. See FIG. 4.

It will be appreciated that the intermediate level bits may be provided by a method which includes writing a series of zeros onto a card, covering or part of the card signature region with a thin mask or masks, and then writing a series of ones onto the card signature region.

In another method, the card signature can be first written with a write head set to write either logic "1" or logic "0" at respective saturated signal energy levels. The write head is then set at an unsaturated signal energy level and either logic "0" or logic "1" is written respectively on the card over the first written data. This provides the special card signature with the appropriate intermediate magnetic values as required.

It will be noted that in embodiments of the invention the inherent inconsistencies of a magnetic stripe are used to form a unique card signature. These inconsistencies occur as a matter of practice even when present day quality controlled stripes are manufactured. The magnetic recording level is then set up so that a manageable number of inconsistencies will show up when the card is read, and information about the physical positions of the inconsistencies is noted and stored. To check a card signature for genuineness, the reader is checked to see whether it is "confused" when reading one, or usually several, of the points. This means that every card in practice will have a unique signature that can be verified for genuineness. One advantage in practice is that a simple first appraisal test is to read the card twice. Two consecutive identical card signature read-outs indicates immediately that the card is almost certainly not genuine. In terms of security, this offers an easy and reliable point-of-use or point-of-sale test. Also, as is clear and has been explained already, it is virtually impossible to produce a fake card having the same signature because it would mean establishing corresponding inconsistencies at many physical positions along the length of the card signature, certainly in order to satisfy a full test of a card.

We claim:

1. A magnetic card having normal coded information carried on the card, each bit of the normal coded information being formed by a magnetic value representing either a one or a zero for detection by a card reader arranged to normally allocate either a one or a zero to each bit, including a card signature formed by bits positioned at fixed relative positions on the card having intermediate magnetic values to which in use the reader randomly allocates a one or a zero.

2. A magnetic card according to claim 1, in which the signature bits are positioned at fixed positions relative to one or more bits of the normal coded information bits.

3. A magnetic card according to claim 1, in which the signature bits are positioned at fixed relative positions to a signature marker bit carried on the card.

4. A magnetic card according to claim 1, in which the signature bits are carried on the card in a first magnetic track extending along the card.

5. A magnetic card according to claim 1, having normal coded information separately representative of a system signature and a user signature, and including a cipher of normal coded information formed by a compilation of the system and user signatures and the card signature.

6. A magnetic card according to claim 5 having three magnetic tracks in which the card signature is formed in a first track, the cipher is formed in a second track, and the user signature is formed in a third track.

7. A magnetic card according to claim 1, in which the card signature is formed in a normally unused part of a magnetic track on the card.

8. A method of forming a magnetic card according to claim 1, in which the card signature is formed by writing either ones or zeros onto a part of a magnetic track of a blank card, covering the part of the track with thin masks, and writing either zeros or ones respectively onto the part of tracks to form a number of bits having intermediate magnetic values to form the card signature.

9. A method according to claim 8, including covering the card signature with a protective thick mask, writing normal coded information on to the card, and then removing the protective mask.

10. A method of forming a magnetic card according to claim 1, in which the card signature is formed by normally writing ones or zeros onto part of a magnetic track of a blank stripe, and writing either zeros or ones respectively onto the same part of the stripe with a writing head set at an energy which would normally produce unsaturated magnetic levels for the magnetic data.

* * * * *